United States Patent
Takamura et al.

(10) Patent No.: US 8,167,070 B2
(45) Date of Patent: May 1, 2012

(54) BATTERY TEMPERATURE REGULATING SYSTEM AND METHOD FOR AN ELECTRIC VEHICLE, BATTERY HOUSING BOX FOR AN ELECTRIC VEHICLE, AND VEHICLE INCORPORATING SAME

(75) Inventors: Toshiaki Takamura, Saitama (JP); Atsushi Otsu, Saitama (JP); Takashi Sone, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/629,515

(22) Filed: Dec. 2, 2009

(65) Prior Publication Data
US 2010/0163326 A1 Jul. 1, 2010

(30) Foreign Application Priority Data
Dec. 26, 2008 (JP) ................... 2008-332329

(51) Int. Cl.
*B60R 16/04* (2006.01)
(52) U.S. Cl. .............. 180/68.5; 180/68.2; 429/159
(58) Field of Classification Search ............ 180/68.1, 180/68.2, 68.3, 68.5, 65.1; 429/159; 62/186
See application file for complete search history.

(56) References Cited

U.S. PATENT DOCUMENTS

| | | | | |
|---|---|---|---|---|
| 5,421,427 A * | 6/1995 | Ogawa et al. | ........ | 180/220 |
| 5,577,747 A * | 11/1996 | Ogawa et al. | ........ | 180/220 |
| 5,937,664 A * | 8/1999 | Matsuno et al. | ........ | 62/259.2 |
| 6,094,927 A * | 8/2000 | Anazawa et al. | ........ | 62/239 |
| 6,455,186 B1 * | 9/2002 | Moores et al. | ........ | 429/71 |
| 6,949,309 B2 * | 9/2005 | Moores et al. | ........ | 429/50 |
| 7,210,550 B2 * | 5/2007 | Yonehana et al. | ........ | 180/220 |
| 7,451,608 B2 * | 11/2008 | Kikuchi | ........ | 62/186 |
| 7,647,788 B2 * | 1/2010 | Okuda et al. | ........ | 62/259.2 |
| 7,931,110 B2 * | 4/2011 | Nishiura et al. | ........ | 180/220 |
| 7,939,193 B2 * | 5/2011 | Moores et al. | ........ | 429/62 |
| 2004/0238242 A1 * | 12/2004 | Honda et al. | ........ | 180/65.1 |
| 2007/0289789 A1 * | 12/2007 | Tsuchiya | ........ | 180/68.2 |

FOREIGN PATENT DOCUMENTS

| | | |
|---|---|---|
| JP | 07-112617 | 5/1995 |
| JP | 2508512 | 6/1996 |

* cited by examiner

*Primary Examiner* — J. Allen Shriver, II
*Assistant Examiner* — James Triggs
(74) *Attorney, Agent, or Firm* — Carrier Blackman & Associates, P.C.; Joseph P. Carrier; William D. Blackman

(57) ABSTRACT

A battery housing structure, in an electric vehicle, is operable to regulate a temperature of a battery disposed between front and rear wheels of the vehicle. The battery housing structure includes a main housing body for receiving the battery, inlet and outlet ports for respectively supplying air to and discharging air from the main housing body; and a fan for discharging air from the main housing body. A bypass passage is provided in the battery housing structure for selectively connecting a downstream side of the fan with the inlet ports. First and second air flow control valves are also provided in the battery housing structure for selectively controlling and routing the flow of air within the battery housing structure.

20 Claims, 9 Drawing Sheets

BATTERY TEMPERATURE REGULATING SYSTEM AND METHOD FOR AN ELECTRIC VEHICLE, BATTERY HOUSING BOX FOR AN ELECTRIC VEHICLE, AND VEHICLE INCORPORATING SAME

CROSS-REFERENCE TO RELATED APPLICATIONS

The present invention claims priority under 35 USC 119 based on Japanese patent application No. 2008-332329, filed on Dec. 26, 2008. The entire subject matter of this priority document, including specification claims and drawings thereof, is incorporated by reference herein.

BACKGROUND OF THE INVENTION

1. Field of the Invention

The present invention relates to a battery temperature control system and method for regulating battery temperatures in a saddle-riding type electric vehicle, and to a vehicle including the described battery temperature control system. More particularly, the present invention relates to a battery temperature control system and method in which a controller cooperates with a battery housing structure to regulate the temperature of batteries stored therein, during operation of a saddle-riding type electric vehicle, and to a vehicle incorporating the temperature control system.

2. Background Art

There is a known electric motorcycle (a saddle-riding type electric vehicle) having a battery (including a plurality of battery cells) mounted thereon, and the motorcycle is designed to drive a motive power generating motor for running by electricity supplied from this battery. Such a known saddle-riding type electric vehicle uses a cooling fan to draw air outwardly from inside of a battery box which houses the battery, for the purpose of cooling the battery which generates heat during operation. Thus, the battery is cooled by air. An example of such cooling system for battery is discussed in the Japanese Unexamined Patent Application Publication No. Hei 7-112617.

As another example, Japanese Utility Model Registration No. 2508512 discloses a configuration in which the battery is cooled by introducing a running wind into the battery box.

The above conventional saddle-riding electric vehicles are capable of preventing deterioration of the battery performances by cooling the heated batteries by air. In general, however, it is likely that the battery may deteriorate its performance when the temperature of battery falls. For this reason, it is desirable that the battery temperature be adjustable so as not to deviate from its appropriate operating temperature.

The present invention has been made to overcome such drawbacks of the existing battery housing structure. Accordingly, it is one of the objects of the present invention to provide a battery housing structure capable of appropriately regulating a temperature of a battery housed in a saddle-riding type electric vehicle.

SUMMARY OF THE INVENTION

In order to achieve the above objects, an illustrative embodiment of the present invention provides a temperature control system and method for a saddle-riding type electric vehicle having a battery housing structure, in which a battery is placed between the front and rear wheels in a vehicle front-rear direction. The battery housing structure includes a housing box for housing multiple battery cells; inlet ports through which air is taken into the housing box from a vehicle front; an outlet port through which the air is discharged from the housing box to a vehicle rear; a fan for flowing air from the housing box to the outlet port; a bypass passage for communicating the downstream of the fan and the inlet ports with each other; a first air flow control valve for controlling the flow of the air in order that the air should alternatively flow from the inlet ports to the housing box, or from an exit of the bypass passage to the housing box; and a second air flow control valve for controlling the flow of the air in order that the air should alternatively flow from the housing box to the outlet port, or from the housing box to an entrance of the bypass passage.

Such configuration of the battery housing structure enables the first air flow control valve to control the air taken in through the inlet ports in order that the air should flow into the inside of the housing box, and enables the second air flow control valve to control the air in order that the air should flow from the inside of the housing box to the outlet port. Thus, this configuration makes it possible to air-cool the battery with the air taken in through the inlet ports.

In addition, such configuration enables the first air flow control valve and the second air flow control valve to control the air inside the housing box such that the air circulates inside the housing box through bypass passage by shutting off a passage between the inlet ports and the housing box, as well as a passage between the housing box and the outlet port. Accordingly, this configuration is capable of warming the battery by circulating the air which is heated by use of heat produced by the battery and the like.

Consequently, this configuration is capable of cooling or heating the battery by causing the first air flow control valve and the second air flow control valve to control the flow of the air flowing in the housing box, and is accordingly capable of adjusting the temperature of the battery to an appropriate temperature.

With respect to the configuration, the housing box includes a main housing body and a lid body member. The lid body member may include the inlet ports, the outlet port, the bypass passage, the first air flow control valve and the second air flow control valve.

This configuration enhances the maintainability and assemblability of the lid body member, because the lid body member includes the inlet ports, the outlet port, the bypass passage, the first air flow control valve and the second air flow control valve so that all the component parts concerning the control of the flow of the air are collectively provided to the lid body member. In addition, this configuration brings about an advantage that the housing main body is constructed with a simpler structure.

Furthermore, a temperature sensor is provided to at least one of the inlet ports, the outlet port and the housing box. Thus, depending on an output from the temperature sensor, the opening and closing of each of the first air flow control valve and the second air flow control valve may be controlled.

In this case, the flow of the air inside the housing box is capable of being adjusted by controlling the opening and closing of each of the first air flow control valve and the second air flow control valve depending on the temperature of at least one of the inlet ports, the outlet port and the housing box. Thus, depending on the temperature of the inside of the housing box, the temperature of the battery is capable of being adjusted appropriately.

Moreover, a temperature sensor is provided to at least one of the inlet ports, the outlet port and the housing box. Thus, depending on an output from the temperature sensor, the air flow rate of the fan may be controlled.

In this case, the flow of the air inside the housing box is capable of being adjusted by controlling the air flow rate of the fan depending on the temperature of at least one of the inlet ports, the outlet port and the housing box. Thus, depending on the temperature inside the housing box, the temperature of the battery is capable of being adjusted appropriately.

Additionally, in a case where the temperature measured by the temperature sensor is higher than a reference temperature for opening control, the first air flow control valve and the second air flow control valve may be controlled in order to be opened.

In this case, once the temperature of the battery exceeds the reference temperature for opening control, the battery is capable of being cooled with the air entering the housing box through the inlet ports, passing the inside of the housing box, and being discharged through the outlet port by opening the first air flow control valve and the second air flow control valve.

In addition, in a case where the temperature measured by the temperature sensor is lower than a reference temperature for closing control, at least one of the first air flow control valve and the second air flow control valve may be controlled in order to be closed.

In this case, once the temperature of the battery becomes lower than the reference temperature for closing control, it is possible to make the air stay inside the housing box, because at least one of the inlet ports and the outlet port are closed. Thereby, the air heated by use of heat produced by the battery and the like stays inside the housing box. Thus, the battery is capable of being heated by use of this heated air.

EFFECTS OF THE INVENTION

The present invention is capable of cooling or heating (i.e., regulating the temperature of) the battery by controlling the first air flow control valve and the second air flow control valve to control the flow of the air flowing in the housing box. Accordingly the present invention is capable of regulating the temperature of the battery to an appropriate (operable) temperature.

In addition, the present invention enhances the maintainability and assemblability of the lid body member, because the present invention collectively includes, in the lid body member, all the component parts concerning the control of the flow of the air. Furthermore, the present invention is capable of constructing the main housing body with a simpler structure.

Moreover, the present invention is capable of adjusting the flow of the air inside the housing box depending on the temperature of the inside of the housing box, and is accordingly capable of adjusting the temperature of the battery appropriately.

Besides, the present invention is capable of controlling the air flow rate of the fan depending on the temperature of the inside of the housing box, and is accordingly capable of adjusting the temperature of the battery appropriately.

As well, the present invention is capable of cooling the battery whose temperature becomes higher by use of the air taken in through the inlet ports.

Also, the present invention is capable of causing the air heated by use of heat produced by the battery and the like to stay inside the housing box, and is accordingly capable of heating the battery whose temperature becomes lower by use of the heated air.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
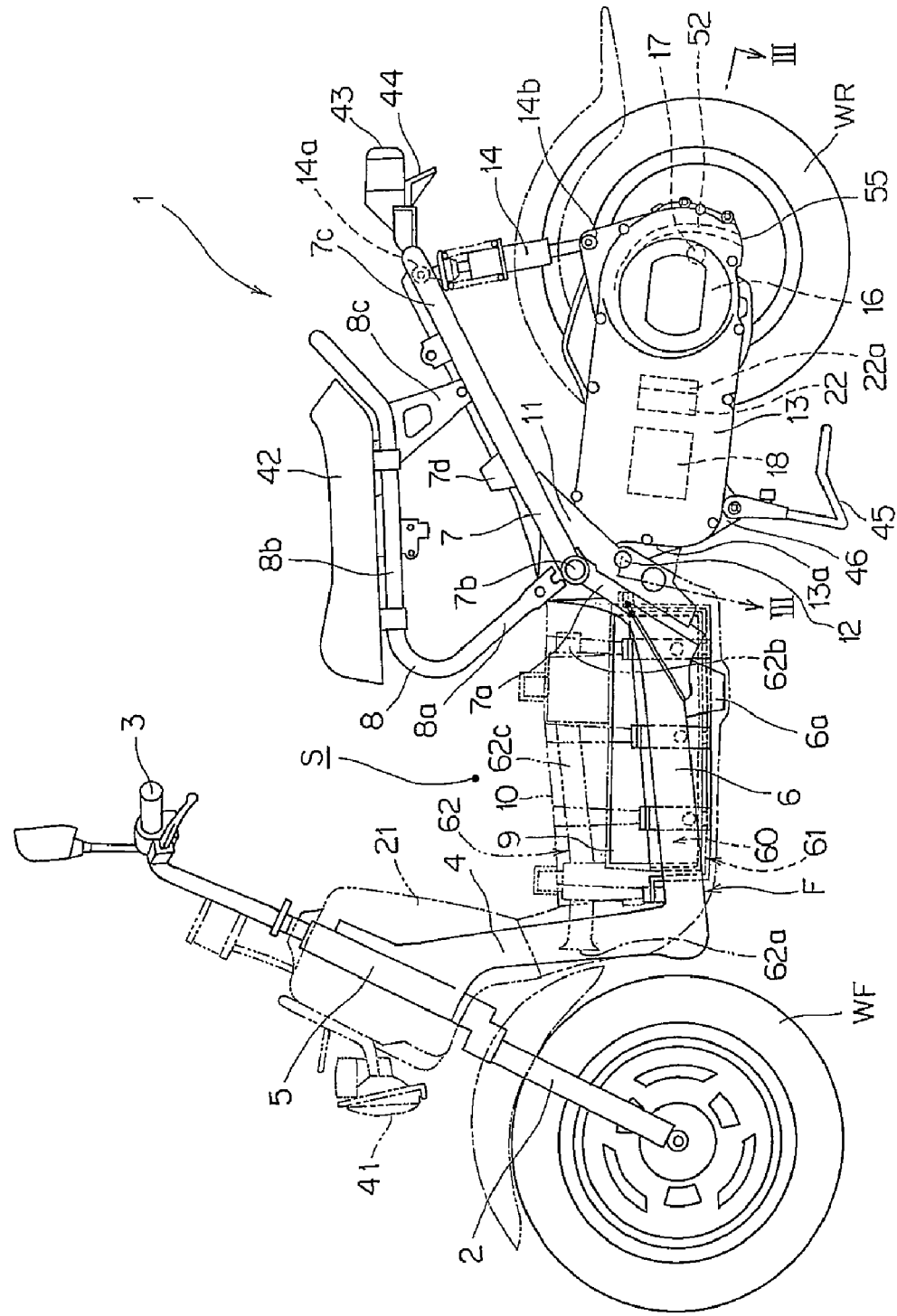
FIG. 1 is a side view of a saddle-riding type electric vehicle according to an illustrative embodiment of the present invention.

A specific illustrative embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Now, referring to the drawings, a saddle-ridding type electric vehicle according to an illustrative embodiment of the present invention is described. Again, in the following description, upward, downward, frontward, rearward, leftward and rightward indicate directions viewed from the vantage point of a driver.

Figure 2:
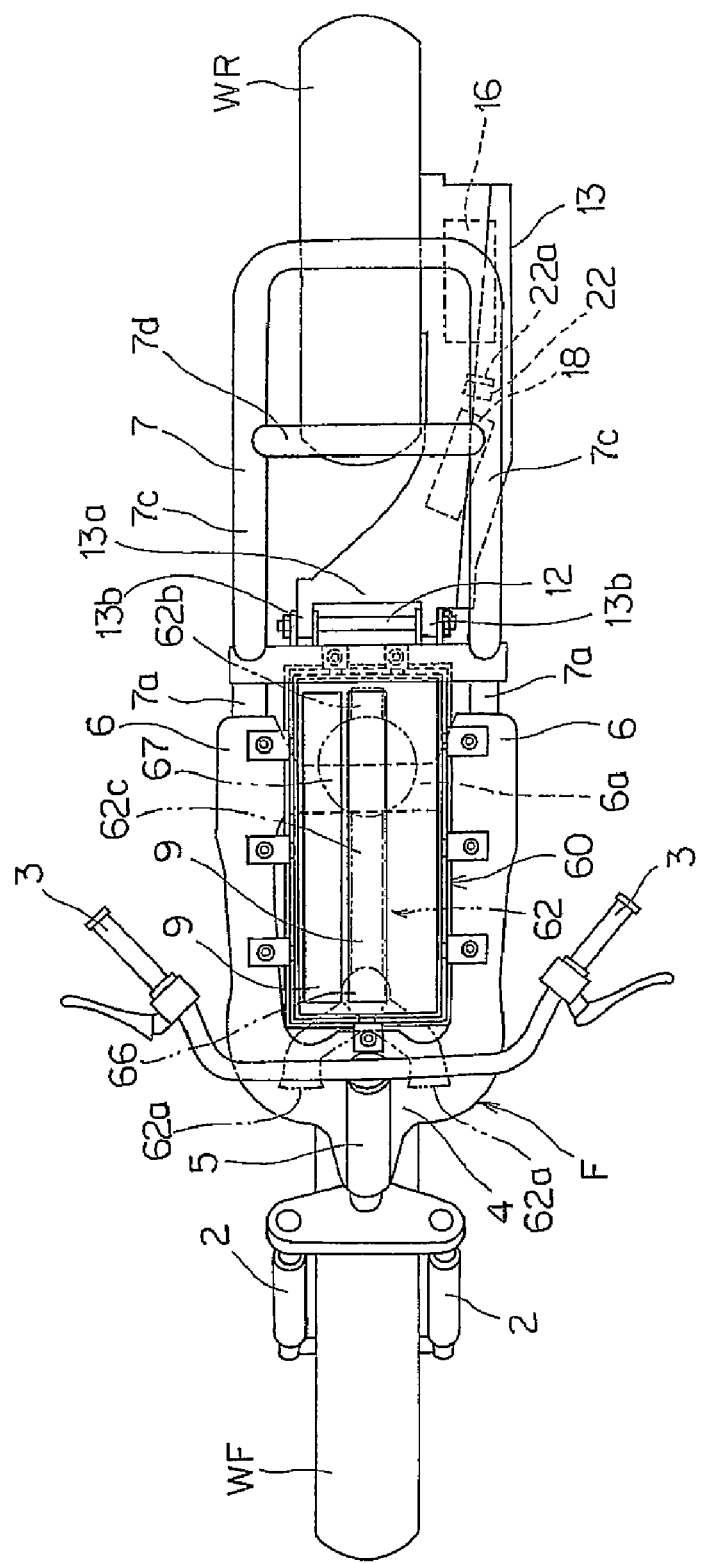
FIG. 2 is a plan view of the saddle-riding type electric vehicle.

FIG. 1 is a side view of the saddle-riding type electric vehicle according to the embodiment of the present invention. FIG. 2 is a top plan view of the saddle-riding type electric vehicle. It may be note that seat rails 8, a fender cover 21 and a step floor 10 shown in FIG. 1 are omitted from FIG. 2 for simplification of explanation.

The saddle-riding type electric vehicle 1 is an electric motorcycle (electric vehicle) of a type driven by a battery. A vehicle body frame F of the saddle-riding type electric vehicle 1 has a head pipe 5 at a front end thereof. The vehicle body frame F further includes a down tube 4 connected to the head pipe 5, and extending downward; lower frames 6 connected to the lowermost end of the down tube 4, and extending to the rear of the vehicle; rear frames 7 connected to the rear ends of the lower frames 6, respectively, and extending rearward and upward; and the seat rails 8 connected to the rear frames 7, and extending over the rear frames 7, respectively.

Here, the lower frames 6 include paired left and right lower frames which are symmetrically placed; the rear frames 7 include paired left and right rear frames which are symmetrically placed; and the seat rails 8 include paired left and right seat rails which are symmetrically placed. In addition, the head pipe 5 supports a front fork 2 for supporting a front wheel WF so as to allow the front fork 2 to be operated flexibly for steering. A steering handle 3 is fixed to the uppermost portion of the front fork 2.

As shown in FIG. 2, the lower frames 6 are connected together by use of a cross member 6a for connecting the left and right lower frames 6 together in the vehicle width direction.

Further, each of the rear frames 7 includes a first tilting part 7a extending obliquely upward from the rear end of the corresponding lower frame 6 to the rear of the vehicle; and a second tilting part 7c extending obliquely upward from a bent part 7b to the rear of the vehicle at a tilting angle which is smaller than that at which the first tilting part 7a tilts. The bent part 7b is bent at a rear end portion of the first tilting part 7a. In addition, as shown in FIG. 2, the left second tilting part 7c and the right second tilting part 7c are connected together by using a cross frame 7d extending in the vehicle width direction.

Moreover, the seat rails 8 are shaped substantially like an inverted letter U, and are attached on top of the rear frames 7. Each of the seat rails 8 includes a tilting part 8a extending obliquely frontward from the bent part 7b of the rear frame 7 to the front of the vehicle; a horizontal part 8b extending horizontally rearward from the uppermost end of this tilting part 8a; and a supporting part 8c extending rearward and obliquely downward from the rear portion of this horizontal part 8b to the second tilting part 7c of the rear frame 7.

As shown in FIG. 1, a pivot plate 11 projecting to the rear of the vehicle is provided at the lower side of the bent part 7b of each of the left and right rear frames 7, the lower side being in a vicinity of the connecting part between the rear frame 7 and the lower frame 6. The left and right pivot plates 11 are provided with a pivot shaft 12 penetrating the pivot plates 11 in the vehicle width direction. A front end portion of a swing arm 13 is attached to this pivot shaft 12. Thus, the swing arm 13 rotates around this pivot shaft 12 upward and downward.

The swing arm 13 is connected to the second tilting part 7c of the rear frame 7 by use of a rear suspension 14 located in the left side of the vehicle in the vehicle width direction. Specifically, an uppermost part 14a of the rear suspension 14 is attached to the second tilting part 7c of the rear frame 7, whereas a lowermost part 14b of the rear suspension 14 is attached to a rear portion of the swing arm 13. Thereby, this rear suspension 14 absorbs upward and downward vibrations of a rear wheel WR supported by a rear end portion of the swing arm 13.

Paired rotational supporting parts 13b rotatably attached to the pivot shaft 12 are provided to an extremity portion of the front side of the swing arm 13 so as to be spaced apart in the left and right in the vehicle width direction The swing arm 13, attached to the pivot shaft 12, extends obliquely leftward to the rear of the vehicle so as to avoid the rear wheel WR, and thereafter extends to the rear of the vehicle along the left side of the rear wheel WR. A rear wheel axle 17 extending in the vehicle width direction is provided at a rear portion of the swing arm 13. The rear wheel WR is rotatably supported by this rear wheel axle 17 at only one end.

In addition, as shown in FIG. 1, an attachment part 46 for supporting a main stand 45 is formed in a lower side of the swing arm 13.

As shown in FIGS. 1 and 2, the electric vehicle 1 includes a headlight 41 for illuminating the road ahead of the vehicle; a rider's seat 42 mounted on the horizontal parts 8b of the respective seat rails 8; a brake lamp 43 attached to the rear end portion of the rear frames 7; and a reflector 44 located under the brake lamp 43.

Figure 3:
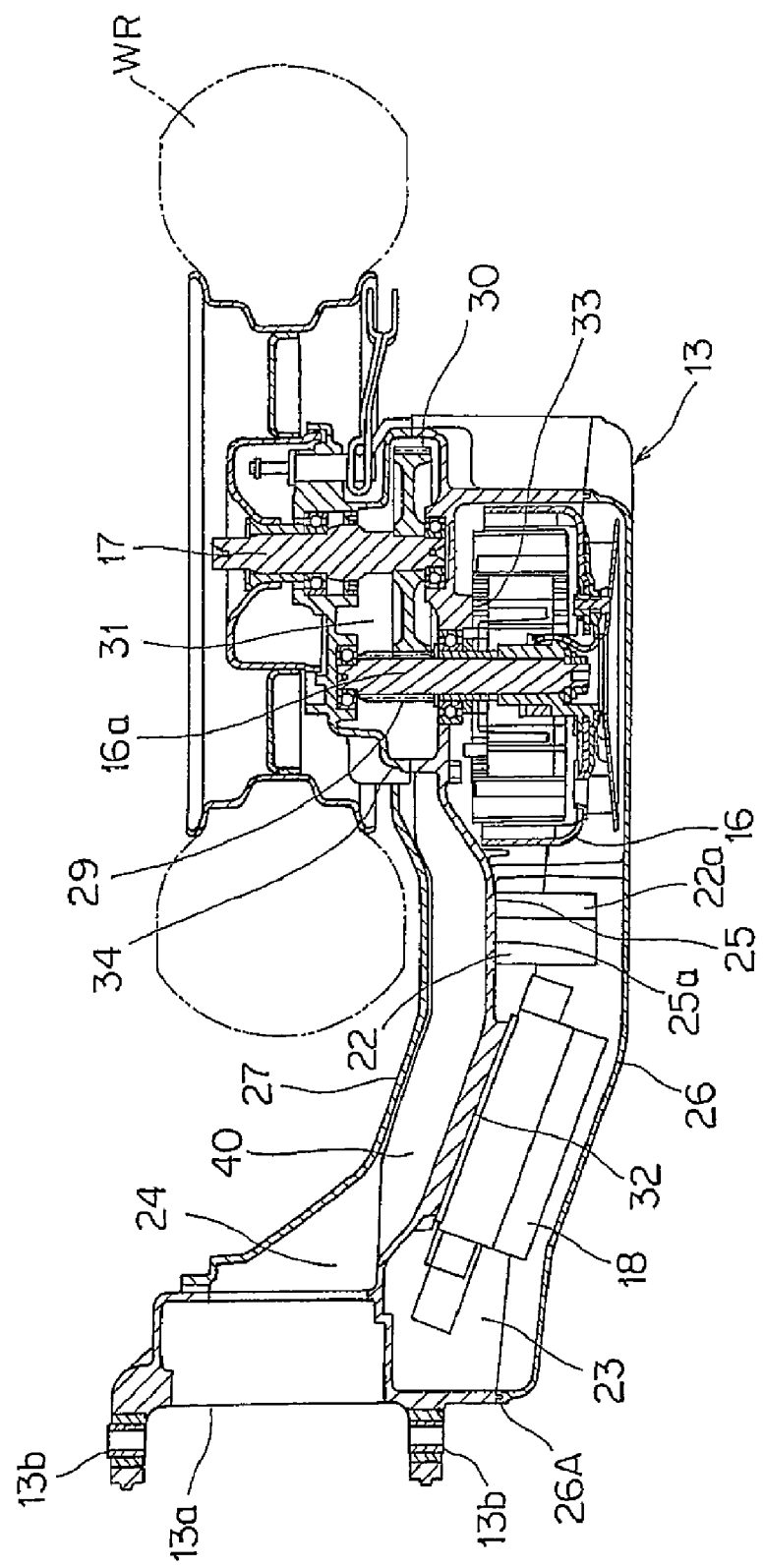
FIG. 3 is a cross-sectional view of the saddle-riding type electric vehicle taken along the III-III line of FIG. 1.

FIG. 3 is a cross-sectional view of the saddle-riding type electric vehicle taken along the line III-III of FIG. 1, and mainly shows the swing arm 13 of the vehicle 1.

The swing arm 13 is configured by assembling a main body part 25, a left-side cover 26 and a right side cover 27 together. The main body part 25 includes a partition wall 25a extending in the vehicle front-rear direction. The left-side cover 26 covers the left side surface of this main body part 25. The right-side cover 27 covers the right side surface of the main body part 25.

Two utility spaces are formed inside the swing arm 13. The two utility spaces include an equipment attachment space 23 located in the left side of the vehicle body (the outer side of the vehicle body); and an air introduction space 24 located in the right side of the vehicle body (the inner side of the vehicle body). The spaces 23, 24 are respectively defined in the left and right in the vehicle width direction by the partition wall 25a. The spaces 23, 24 extend in the vehicle front-rear direction.

In addition, the left side surface of the equipment attachment space 23 is closed by detachably attaching the left-side cover 26 to the main body part 25 by use of bolts or the like, whereas the right side surface of the air introduction space 24 is closed by detachably attaching the right-side cover 27 to the main body part 25 by use of bolts or the like as in the case of the left-side cover 26.

A motive power generating motor 16 for driving the rear wheel WR and a Power Drive Unit (PDU) 18 for controlling this motive power generating motor 16 are housed in the equipment attachment space 23. The motive power generating motor 16 and the PDU 18 are designed to be capable of being maintained while the left-side cover 26 is detached.

As shown in FIG. 3, the motive power generating motor 16 is placed in a rear portion of the swing arm 13. The motive power generating motor 16 is detachably attached to a motive power generating motor attachment part 33 formed in the partition wall 25a. A drive axle 16a of the motive power generating motor 16 is placed almost in parallel with the rear wheel axle 17 of the rear wheel WR. The drive axle 16a thereof projects from the equipment attachment space 23 to the air introduction space 24 in such a way as to penetrate the partition wall 25a.

A drive gear 29 is provided on this drive axle 16a, and the drive gear 29 meshes with a deceleration gear 30 provided on the rear wheel axle 17. The diameter of this drive gear 29 is smaller than that of the deceleration gear 30. The drive 29 decelerates a driving force from the motive power generating motor 16 by one step, and thus transmits the resultant diving force to the rear wheel axle 17.

A gear cover 34 is attached to the main body part 25 located in a rear portion of the swing arm 13 such that the motive power transmitting part including the drive gear 29 and the deceleration gear 30 is covered with the gear cover 34. The gear cover 34 defines a driving force transmitting space 31 and the air introduction space 24. The driving force transmitting space 31 is that in which the motive force transmitting part is placed. The gear cover 34 hermetically seals off the inside of the driving force transmitting space 31, and thus enables a lubricant to be held in the driving force transmitting space 31.

As shown in FIGS. 2 and 3, the PDU 18 is placed in front of the motive power generating motor 16. The PDU 18 is detachably attached to a PDU attachment surface 32 formed on the partition wall 25a by using of bolts or the like. A drive circuit, a capacitor, heat sink and the like (all not shown in the drawings) are housed inside the PDU 18.

In addition, the PDU 18 is operatively connected to battery cells 9 (see FIG. 2) via connecting wires (not shown) for transmitting electric power from the battery cells 9 to the PDU 18. Furthermore, the PDU 18 is operatively connected to an Electric Control Unit (ECU) 22 by using wiring (cables).

The ECU 22 includes a controller 22*a* for controlling various components of the PDU 18. The control signals from the ECU 22 are transmitted to the PDU 18. Moreover, the PDU 18 is connected to the motive power generating motor 16, as well, by using another set of wiring (not shown). Electric power and control signals are transmitted from the PDU 18 to the motive power generating motor 16. The ECU 22 is disposed inside the swing arm 13.

The drive circuit and the like included in the PDU 18 produce more heat than the other components. For this reason, the PDU 18 is attached to the PDU attachment surface 32 of the partition wall 25*a* such that the PDU 18 is in intimate contact with the PDU attachment surface 32 with an area as large as possible. The PDU 18 causes heat produced by the drive circuit and the like to be thermally conducted to the partition wall 25*a*, and thus radiates the heat from itself.

On the other hand, multiple fins 40 project from the partition wall 25*a* to the air introduction space 24. Thus, the heat thermally having conducted from the PDU 18 to the partition wall 25*a* is further thermally conducted to the fins 40.

A front-side opening part 13*a* is formed in the front end portion of the air introduction space 24. Air is introduced into the air introduction space 24 through the front-side opening part 13*a*.

An air opening (not shown) for providing communication between the air introduction space 24 and the equipment attachment space 23 is formed in a part of the partition wall 25*a*, to which the motive power generating motor 16 is attached. In addition, as shown in FIG. 1, an air guide passage 52 for causing the inside of the motive power generating motor 16 and the outside of the swing arm 13 to communicate with each other is formed inside the motive power generating motor 16. An air outlet port 55 which is opened downward from the swing arm 13 is formed at an end of the air guide passage 52.

Accordingly, the air taken in through the front-side opening part 13*a* passes the air introduction space 24, and thereafter flows into the motive power generating motor 16 through the air opening. Thereby, the air cools the inside of the motive power generating motor 16. Subsequently, the air passes the air guide passage 52, and is consequently discharged to the atmosphere through the air outlet port 55.

As shown in FIGS. 1 and 2, a housing box 60 is placed between the front wheel WF and the rear wheel WR. Battery cells (battery) 9 are housed in the housing box 60. The housing box 60 is attached to the left and right lower frames 6 in such a way as to be sandwiched by the left and right lower frames 6. The bottom surface of the housing box 60 is located lower than the lower frames 6 when FIG. 1 is viewed from the side. The cross member 6*a* of the lower frames 6 is shaped to have a center portion in the vehicle width direction bent downward. The housing box 60 is placed on this cross member 6*a* and thus is fixed to the left and right lower frames 6.

The location in which the housing box 60 is placed is situated under a feet resting space S in which the feet of a rider are rested. The top side of the housing box 60 is covered with the step floor 10 on which the rider can rest the feet.

A battery housing structure of the housing box 60 is described below.

Figure 4:
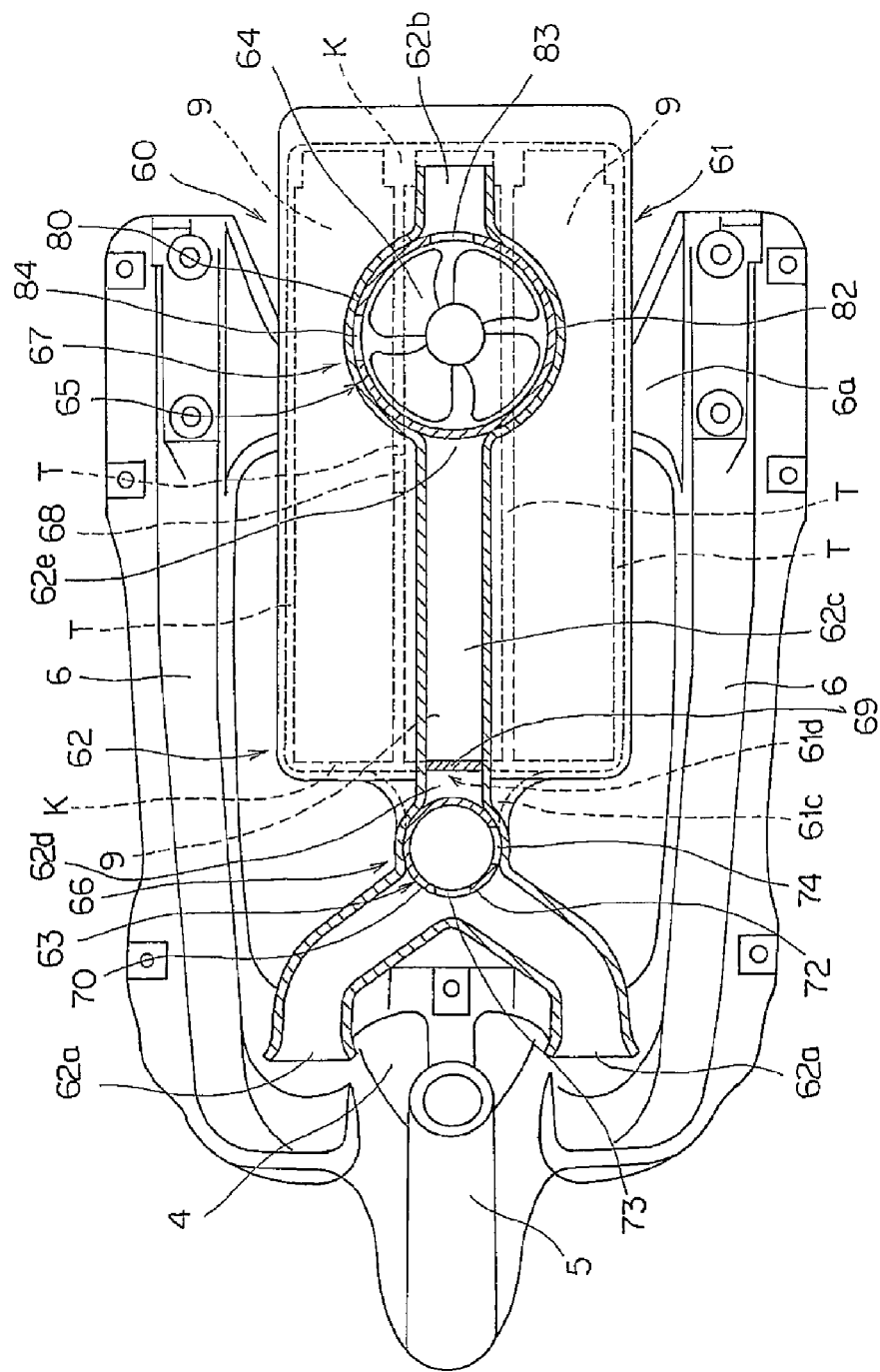
FIG. 4 is a plan view of a housing box and its vicinity.
Figure 5:
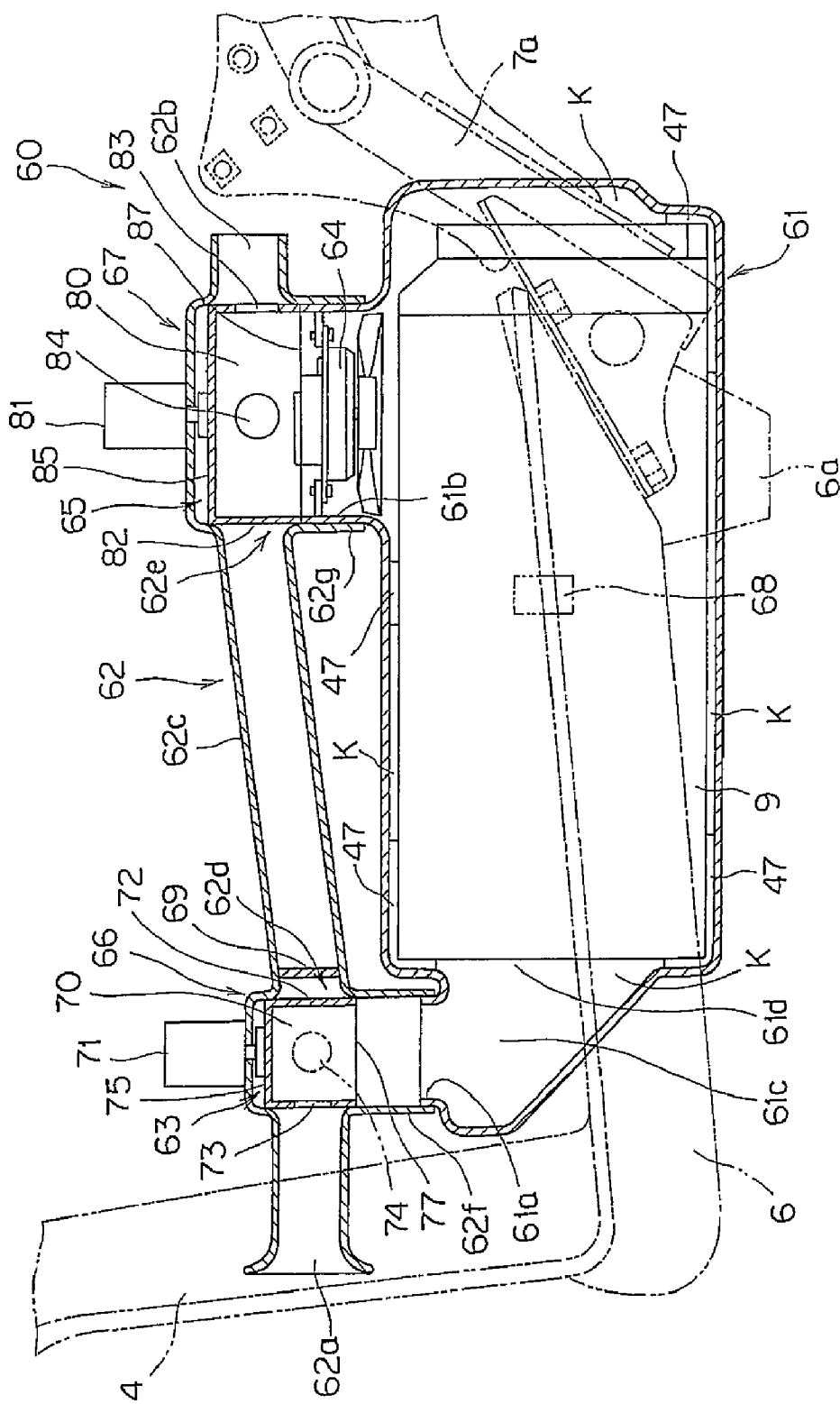
FIG. 5 is a side cross-sectional view of the housing box.

FIG. 4 is a plan view of the housing box 60 and its vicinity.
FIG. 5 is a side cross-sectional view of the housing box 60.

The housing box 60 is configured to adjust a temperature of the battery cells 9 by introducing outer air such as a running wind, or by circulating the air inside the housing box 60.

The housing box 60 includes a main housing body 61 for housing the battery cells 9, and a lid body member 62 detachably provided to the top portion of the main housing body 61. Two cylindrical bodies 61*a*, 61*b* which are opened upwardly are integrally formed in the main housing body 61. Cylindrical bodies 62*f*, 62*g* which are fitted to the two respective cylindrical bodies 61*a*, 61*b* are formed in the lid body member 62. The main housing body 61 and the lid body member 62 are fastened to each other by using fasteners (not shown) with the cylindrical bodies 61*a*, 61*b*, which are respectively fitted to the cylindrical bodies 62*f*, 62*g*.

The lid body member 62 includes an intake duct member having two inlet ports 62*a* formed therein, through which to take air into the main housing body 61. The lid body member 62 also includes an outlet port 62*b* through which to discharge the air from the inside of the main housing body 61 to the outside of the housing box main box 61; an inlet-side switching valve (a first air flow control valve) 63 for controlling the flow of the air in a vicinity of the inlet ports 62*a*; and a bypass passage 62*c* for causing the downstream of a fan 64 and the inlet ports 62*a* to communicate with each other. The lid body member 62 also includes an outlet-side switching valve (a second air flow control valve) 65 for controlling the flow of the air in a vicinity of the outlet port 62*b*. In addition, the fan 64, for causing the air to flow from the main housing body 61 to the outlet port 62*b*, is provided to the cylindrical body 61*b* of the main housing body 61.

The main housing body 61 is shaped like a substantially rectangular box. Each battery cell 9 extends across the main housing body 61 almost fully in the front-rear direction. A total of three battery cells 9 are placed one after another in the vehicle width direction.

A plurality of holding members 47 (see FIG. 5) are provided in the front and rear corner portions of the main housing body 61 as well as in the upper portion of the main housing body 61. The holding members 47 are interposed between the external surfaces of each battery cell 9 and the corresponding wall portions of the main housing body 61. Each battery cell 9 is supported by its corresponding holding members 47 which contact portions of the external surfaces of the battery cell 9. Accordingly, a gap K is formed in an interstice between each battery cell 9 and each of the upper, lower, front and rear wall portions of the main housing body 61.

Furthermore, as shown in FIG. 4, inside the main housing body 61 (in a plan view), a space is formed between each lateral wall of the main housing body 61 and its nearest battery cell 9, whereas a space is formed between each neighboring two of the battery cells 9. These spaces constitute a total of four ventilation passages T where air passes along the lateral surfaces of each battery cell 9.

As shown in FIG. 4, the two inlet ports 62*a* each shaped like a cylinder are opened to the vehicle front at the left and right sides of the down tube 4. The rear ends of the two respective inlet ports 62*a* are connected to an inlet-side bifurcation part 66 provided in front of the main housing body 61, and are thus gathered at this inlet-side bifurcation part 66. As shown in FIG. 5, the inlet-side bifurcation part 66 bifurcates in two directions. One bifurcation of the inlet-side bifurcation part 66 is connected to an exit 62*d* located in the front end of the bypass passage 62*c*, and the other bifurcation of the inlet-side bifurcation part 66 is connected to an inlet passage 61*c* for connecting each inlet port 62*a* and the main housing body 61.

The inlet passage 61*c* is connected to the inlet-side bifurcation part 66 with the cylindrical body 62*f* and the cylindrical body 61*a* being interposed between the inlet passage 61*c* and the inlet-side bifurcation part 66. The inlet passage 61 extends downward, and is thus connected to a front opening 61*d* of the main housing body 61. Most of the vehicle front-side surface of the main housing body 61 is opened, and the opened portion of the main housing body 61 constitutes the front opening 61*d*.

The main housing body 61 extends to a position slightly rearward of the rear ends of the respective lower frames 6. The cylindrical body 61*b* is formed in a rear portion of the main housing body 61 in such a way as to project upward. In addition, an outlet-side bifurcation part 67 bifurcating in two directions is connected to the cylindrical body 61*b*. One bifurcation of the outlet-side bifurcation part 67 is connected to an entrance 62*e* located in the rear end of the bypass passage 62*c*, and the other bifurcation of the outlet-side bifurcation part 67 is connected to the outlet port 62*b*. Furthermore, inside the main housing body 61, a temperature sensor 68 for measuring the temperature of one of the battery cells 9 is provided to a side surface of the battery cell 9.

The fan 64 placed inside the cylindrical body 61*b* is rotationally driven in order to pull air out from the inside of the main housing body 61 to the outlet-side bifurcation part 67. The fan 64 is driven by electric power from the battery cells 9, and can be used with its air flow rate being switched to either of large and small ones. The bypass passage 62*c* is a conduit for connecting the inlet-side bifurcation part 66 and the outlet-side bifurcation part 67 together. Thus, the bypass passage 62*c* causes each inlet port 62*a* and the downstream of the fan 64 to communicate with each other.

Specifically, as shown in FIG. 4, the inlet-side bifurcation part 66 and the outlet-side bifurcation part 67 are located in the center of the lid body member 62 in the vehicle width direction. The inlet-side bifurcation part 66 and the outlet-side bifurcation part 67 communicate with each other through the single bypass passage 62*c* extending in the front-rear direction.

Moreover, inside the bypass passage 62*c*, a heating coil 69 for heating air flowing in the bypass passage 62*c* is provided in the exit 62*d*. The heating coil 69 is heated with electric power supplied from the battery cells 9.

In addition, the outlet port 62*b* is shaped like a cylinder, and extends rearward from the outlet-side bifurcation part 67. The outlet port 62*b* is opened toward the vehicle rear. The rearmost end of the outlet port 62*b* is located in a position which is closer to the vehicle front than the rearmost end of the main housing body 61.

In this matter, in the housing box 60, the inlet ports 62*a* and the outlet port 62*b* communicate with each other through the main housing body 61 housing the battery cells 9. In addition, the inlet ports 62*a* and the outlet port 62*b* communicate with each other through the bypass passage 62*c*.

The inlet-side bifurcation part 66 and the outlet-side bifurcation part 67 are provided with the inlet-side switching valve 63 and the outlet-side switching valve 65, respectively. The inlet-side switching valve 63 is the first air flow control valve for controlling the flow of the air in order that the air should alternatively flow from the inlet ports 62*a* to the main housing body 61, or from the exit 62*d* of the bypass passage 62*c* to the main housing body 61.

The outlet-side switching valve 65 is the second air flow control valve for controlling the flow of the air in order that the air should alternatively flow from the main housing body 61 to the outlet port 62*b*, or from the main housing body 61 to the entrance 62*e* of the bypass passage 62*c*. Specifically, the flow of the air inside the housing box 60 is controlled by the opening and closing of each of the inlet-side switching valve 63 and the outlet-side switching valve 65.

In this respect, all the component parts concerning the control of the flow of the air inside the housing box 60, such as the inlet ports 62*a*, the inlet-side switching valve 63, the bypass passage 62*c*, the outlet-side switching valve 65 and the outlet port 62*b*, are collectively provided to the lid body member 62. That is, none of the component parts concerning the control of the flow of the air are provided to the main housing body 61.

This simplifies the structure of the main housing body 61, and makes it easy to maintain the battery cells 9, such as to detach the battery cells 9 from the main housing body 61 and to attach the battery cells 9 to the main housing body 61. In addition, the maintainability and assemblability of the lid body member 62 is better, because all the component parts concerning the control of the flow of the air are collectively provided to the lid body member 62. Furthermore, because the cables (not shown) for supplying electric power respectively to the inlet-side switching valve 63 and the outlet-side switching valve 65 are long enough for the lid body member 62 to be easily detached from the main housing body 61, the maintainability of the lid body member 62 is better.

Moreover, the housing box 60 is capable of being located between the down tube 4 and the swing arm 13, because the outlet port 62*b* is so provided in a position in the direction of the vehicle front from the rearmost end of the main housing body 61 that the housing box 60 is compact in the front-rear direction.

As shown in FIG. 5, the inlet-side switching valve 63 includes: an inlet-side valve body 70 shaped like a cylinder; and a valve switching motor 71 for switching the valve body 70 by revolving the valve body 70. The outlet-side switching valve 65 includes: an outlet-side valve body 80 shaped like a cylinder; and a valve switching motor 81 for switching the valve body 80 by revolving the valve body 80. A plurality of holes are formed in the respective predetermined positions in an outer peripheral surface 72 of the inlet-side valve body 70 shaped like a cylinder, whereas multiple holes are formed in the respective predetermined positions in an outer peripheral surface 82 of the outlet-side valve body 80 shaped like a cylinder.

Specifically, an inlet hole 73 passed by the air flowing from the inlet-side ports 62*a* to the main housing body 61 and an inlet-side bypass hole 74 passed by the air flowing from the exit 62*d* of the bypass passage 62*c* to the housing main body 61 are formed in the outer peripheral surface 72 of the inlet-side valve body 70. In addition, an outlet hole 83 passed by the air flowing from the main housing body 61 to the outlet port 62*b* and an outlet-side bypass hole 84 passed by the air flowing from the main housing body 61 to the entrance 62*e* of the bypass passage 62*c* are formed in the outer peripheral surface 82 of the outlet-side valve body 80.

As shown in FIG. 4, the inlet hole 73 and the inlet-side bypass hole 74 are placed in the respective positions which are at almost right angles with each other on the outer peripheral surface 72 when viewed in a plan view. In addition, the outlet hole 83 and the outlet-side bypass hole 84 are placed in the respective positions which are at almost right angles with each other on the outer peripheral surface 82 when viewed in a plan view.

Furthermore, as shown in FIG. 5, a valve switching motor 76 for rotating the inlet-side valve body 70 in a circumferential direction thereof is attached to a top surface 75 of the valve body 70, whereas a valve switching motor 86 for rotating the outlet-side valve body 80 in a circumferential direction thereof is attached to a top surface 85 of the valve body 70. Moreover, an undersurface opening part 77 formed by opening the bottom portion of the valve body inlet-side 70 is formed in a surface opposed to the top surface 75 in the inlet-side valve body 70, whereas an undersurface opening part 87 formed opening the bottom portion of the outlet-side valve body 80 is formed in a surface opposed to the top surface 85 in the outlet-side valve body 80.

The inlet hole 73 and the inlet-side bypass hole 74 communicate with the undersurface opening part 77, whereas the outlet hole 83 and the outlet-side bypass hole 84 communicate with the undersurface opening part 87. Accordingly, the air can pass the insides of the inlet-side valve body 70 and the outlet-side valve body 80, respectively.

As shown in FIG. 4, the inlet-side bifurcation part 66 and the outlet-side bifurcation part 67 are both shaped like a cylinder when viewed in a plan view. The inlet-side switching valve 63 and the outlet-side switching valve 65 are placed in a way that the outer peripheral surfaces 72, 82 contact the inner peripheries of these cylinders, respectively. The valve switching motors 76, 86 are placed in such a way as to project from the top surfaces of the inlet-side bifurcation part 66 and the outlet-side bifurcation part 67, respectively. The valve bodies 70, 80 are rotated in their circumferential directions by the drives of the valve switching motors 76, 86 in the insides of the inlet-side bifurcation part 66 and the outlet-side bifurcation part 67, respectively.

In other words, in a case where the air passages are closed by the outer peripheral surfaces 72, 82 by rotating the valve bodies 70, 80, the flow of the air flowing into the housing box 60 and the flow of the air flowing out of the housing box 60 are capable of being shut off, respectively.

On the other hand, the flow of the air inside the housing box 60 is capable of being controlled by variously changing the positions respectively of the inlet hole 73 and the inlet-side bypass hole 74 by rotating the valve body 70, and concurrently by variously changing the positions respectively of the outlet hole 83 and the outlet-side bypass hole 84 by rotating the valve body 80.

In this respect, the inlet-side switching valve 63, the outlet-side switching valve 65, the fan 64, the temperature sensor 68 and the heating coil 69 are controlled by the controller 22a.

Figure 6:
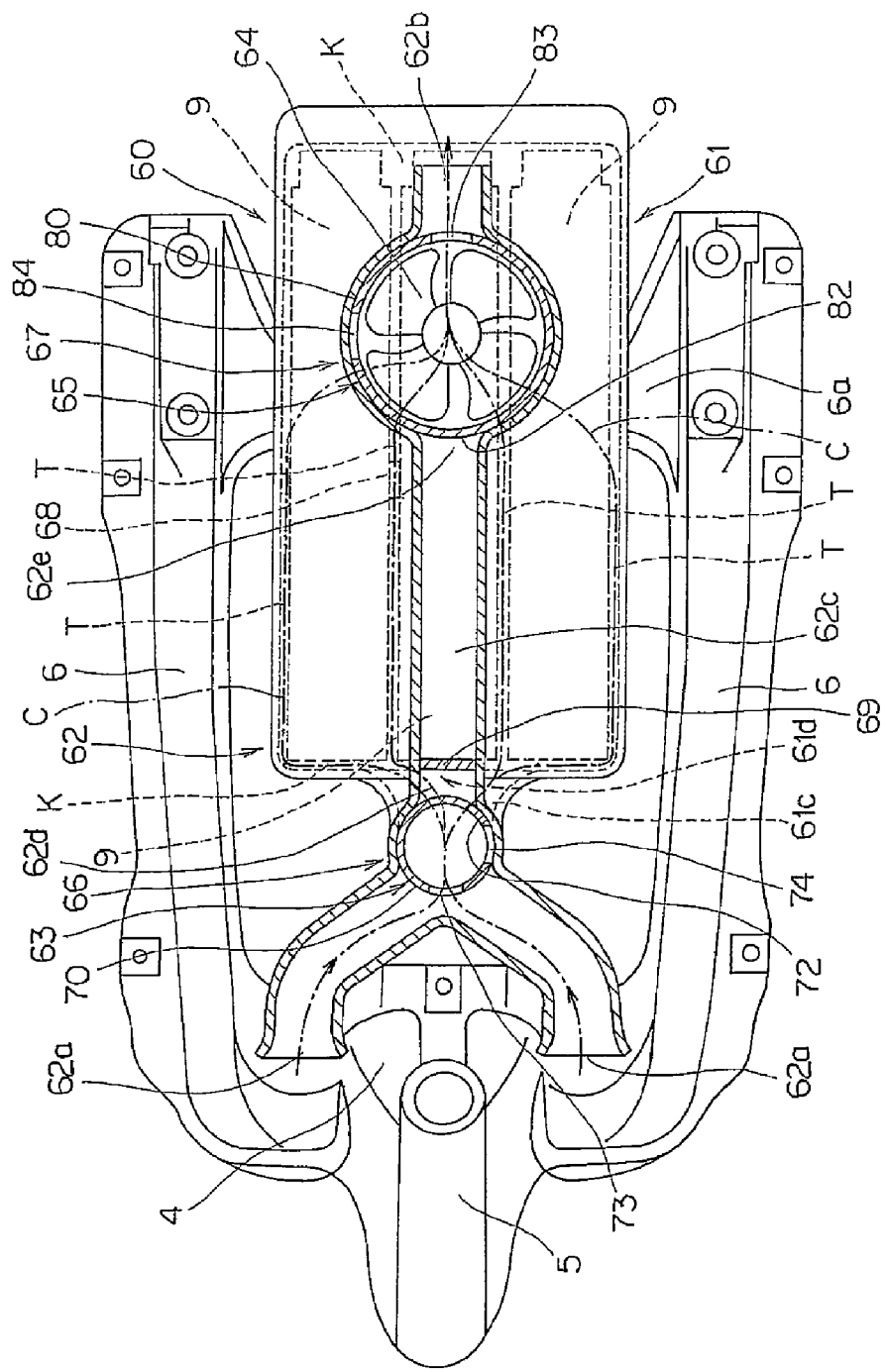
FIG. 6 is a plan cross-sectional view of the housing box during cooling operation (process) of a battery.
Figure 7:
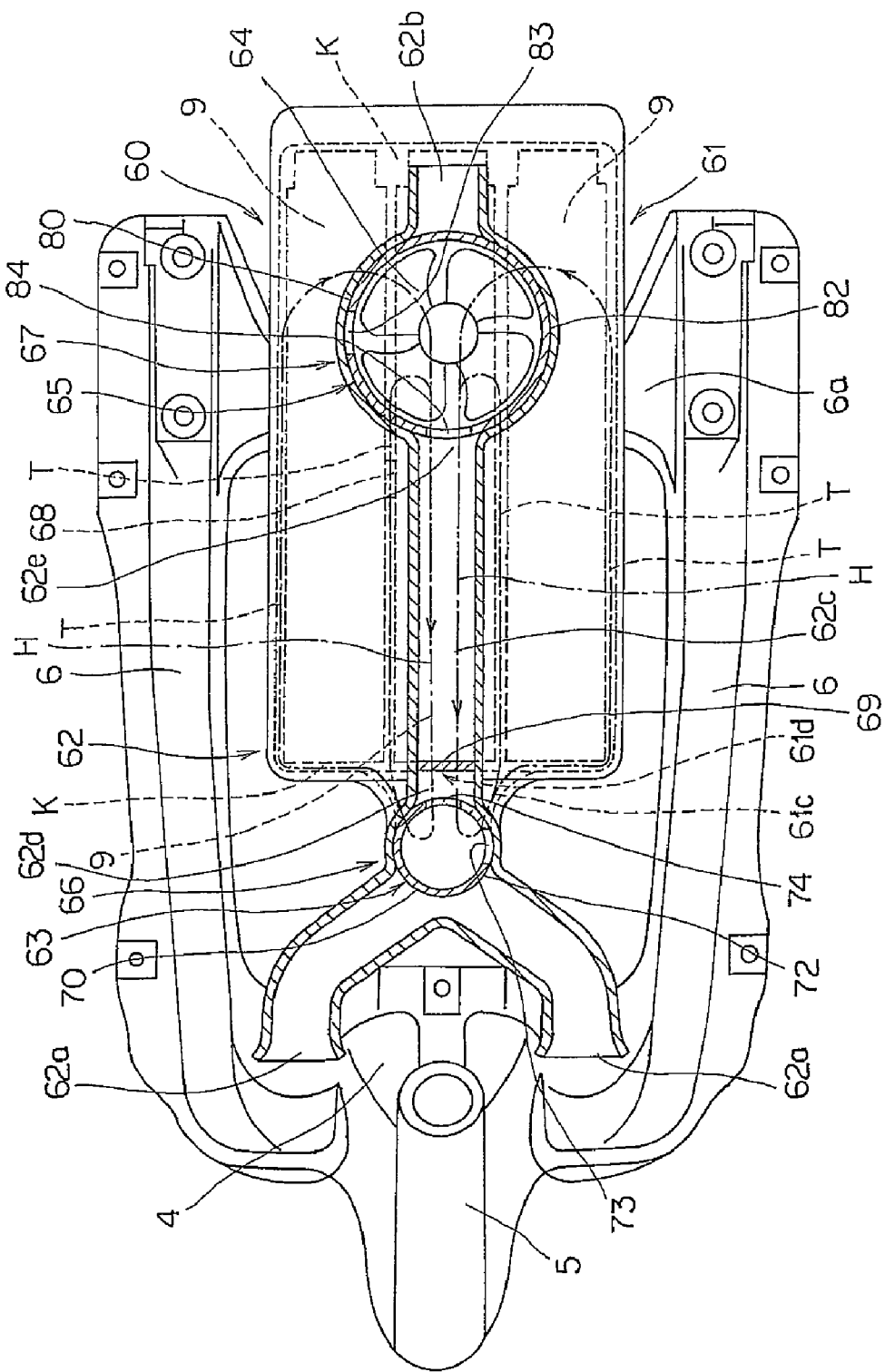
FIG. 7 is a plan cross-sectional view of the housing box during of heating/warming operation of a battery.

FIG. 6 is a plan cross-section view of the housing box 60, which shows how the air flows when cooling the battery cells 9. FIG. 7 is a plan cross-sectional view of the housing box 60, which shows how the air flows when heating the battery cells 9.

The inlet-side switching valve 63 is positioned in the opened condition or in the closed condition depending on its rotated position. While the inlet-side switching valve 63 is in the opened condition, the passage which allows the air to flow from the inlet ports 62a to the main housing body 61 is opened. While the inlet-side switching valve 63 is in the closed condition, the passage which allows the air to flow from the inlet ports 62a to the main housing body 61 is shut off.

As shown in FIG. 6, when the inlet-side switching valve 63 is put into the opened condition, the inlet-side valve body 70 is turned to a position which causes the inlet hole 73 to communicate with the inlet ports 62a, and the inlet-side bypass hole 74 accordingly faces the inner wall of the left side surface of the inlet-side bifurcation part 66. In addition, while the inlet-side switching valve 63 is in this condition, a passage between the bypass passage 62c and the inlet-side bifurcation part 66 is closed by the outer peripheral surface 72. This makes it possible to introduce the external air from the inlet ports 62a, and thereby to lead the introduced external air to the main housing body 61.

As shown in FIG. 7, when the inlet-side switching valve 63 is put into the closed condition, the inlet-side valve body 70 is turned to a position which causes the outer peripheral surface 72 to close the passage between the inlet ports 62a and the inlet-side bifurcation part 66, and the inlet-side bypass hole 74 accordingly communicates with the bypass passage 62c. In addition, while the inlet-side switching valve 63 is in this condition, the inlet hole 73 faces the inner wall of the left side surface of the inlet-side bifurcation part 66.

Accordingly, the passage between the inlet ports 62a and the inlet-side bifurcation part 66 is closed, and it is accordingly possible to shut off the external air flowing to the main housing body 61. Concurrently, thereby, the bypass passage 62c is caused to communicate with the main housing body 61, and it is accordingly possible to cause the air to flow from the bypass passage 62c to the main housing body 61. Furthermore, when the inlet-side switching valve 63 is turned by approximately 90° in the counterclockwise direction in FIG. 6, the inlet-side switching valve 63 is capable of being switched from the opened condition to the closed condition as shown in FIG. 7.

In the housing box 60, as described above, the passage for introducing the external air through the inlet ports 62a to the main housing body 61 and the passage for causing the air to flow from the bypass passage 62c to the main housing body 61 are capable of being switched back and forth, because the single inlet-side switching valve 63 is provided to the inlet-side bifurcating part 66. Such simple configuration makes it possible to control the flow of the air in the housing box 60.

Next, description is provided for how the outlet-side switching valve 65 is opened and closed.

The outlet-side switching valve 65 is put in the opened condition or in the closed condition depending on its rotated position. While the outlet-side switching valve 65 is in the opened condition, the passage which allows the air to flow from the main housing body 61 to the outlet port 62b is opened. While the outlet-side switching valve 65 is in the closed condition, the passage which allows the air to flow from the main housing body 61 to the outlet port 62b is closed.

As shown in FIG. 6, when the outlet-side switching valve 65 is put into the opened condition, the outlet-side valve body 80 is turned to a position which causes the outlet hole 83 to communicate with the outlet port 62b, and the outlet-side bypass hole 84 accordingly faces the inner wall of the right side surface of the outlet-side bifurcation part 67. In addition, while the outlet-side switching valve 65 is in this condition, a passage between the bypass passage 62c and the outlet-side bifurcation part 67 is closed by the outer peripheral surface 82. Accordingly, the air reaching the outlet-side bifurcation part 67 after passing the fan 64 from the main housing body 61 is capable of being discharged through the outlet port 62b.

As shown in FIG. 7, when the outlet-side switching valve 65 is put into the closed condition, the outlet-side valve body 80 is turned to a position which causes the outer peripheral surface 82 to close the passage between the outlet-side bifurcation part 67 and the outlet port 62b, and the outlet-side bypass hole 84 accordingly communicates with the bypass passage 62c. In addition, while the outlet-side switching valve 65 is in this condition, the outlet hole 83 faces the inner surface of the right side surface of the outlet-side bifurcation part 67. Accordingly, the passage between the outlet-side bifurcation part 67 and the outlet port 62b is closed, and it is therefore possible to prevent the air inside the main housing body 61 from being discharged to the outside of the main housing body 61 through the outlet port 62b. Concurrently, the outlet-side bifurcation part 67 communicates with the bypass passage 62c, and accordingly it is possible to cause the air to flow to the bypass passage 62c. Furthermore, when the outlet-side switching valve 65 is turned by approximately 90° in the counterclockwise direction in FIG. 6, the outlet-side switching valve 65 is capable of being switched from the opened condition to the closed condition as shown in FIG. 7.

In the housing box 60, as described above, the passage for discharging the air through the outlet port 62b and the passage for causing the air to flow to the bypass passage 62c are capable of being switched back and forth, because the single outlet-side switching valve 65 is provided to the outlet-side bifurcating part 67. Such simple configuration makes it possible to control the flow of the air in the housing box 60.

Based on a temperature of one of the battery cells 9 (stored in the housing box 60) sensed by the temperature sensor 68, the controller 22a controls the opening and closing of each of the inlet-side switching valve 63 and the outlet-side switching valve 65, the air flow rate of the fan 64, and the turning on/off of the heating coil 69.

Specifically, the temperature of the battery cell 9 measured by the temperature sensor 68 is compared with: a first reference temperature (reference temperature for opening control, reference temperature for closing temperature) which is lower than a temperature appropriate for the battery cell 9; a second reference temperature which is lower than the first reference temperature: a third reference temperature which is lower than the second reference temperature; and a fourth reference temperature which is higher than the temperature appropriate for the battery cell 9. Based on such comparison, the controller 22a adjusts the temperatures of the respective battery cells 9 to the appropriate temperature. The first to fourth reference temperatures are all set up for the controller 22a in advance, and are stored in a memory (whose illustration is omitted) included in the controller 22a.

Figure 8:
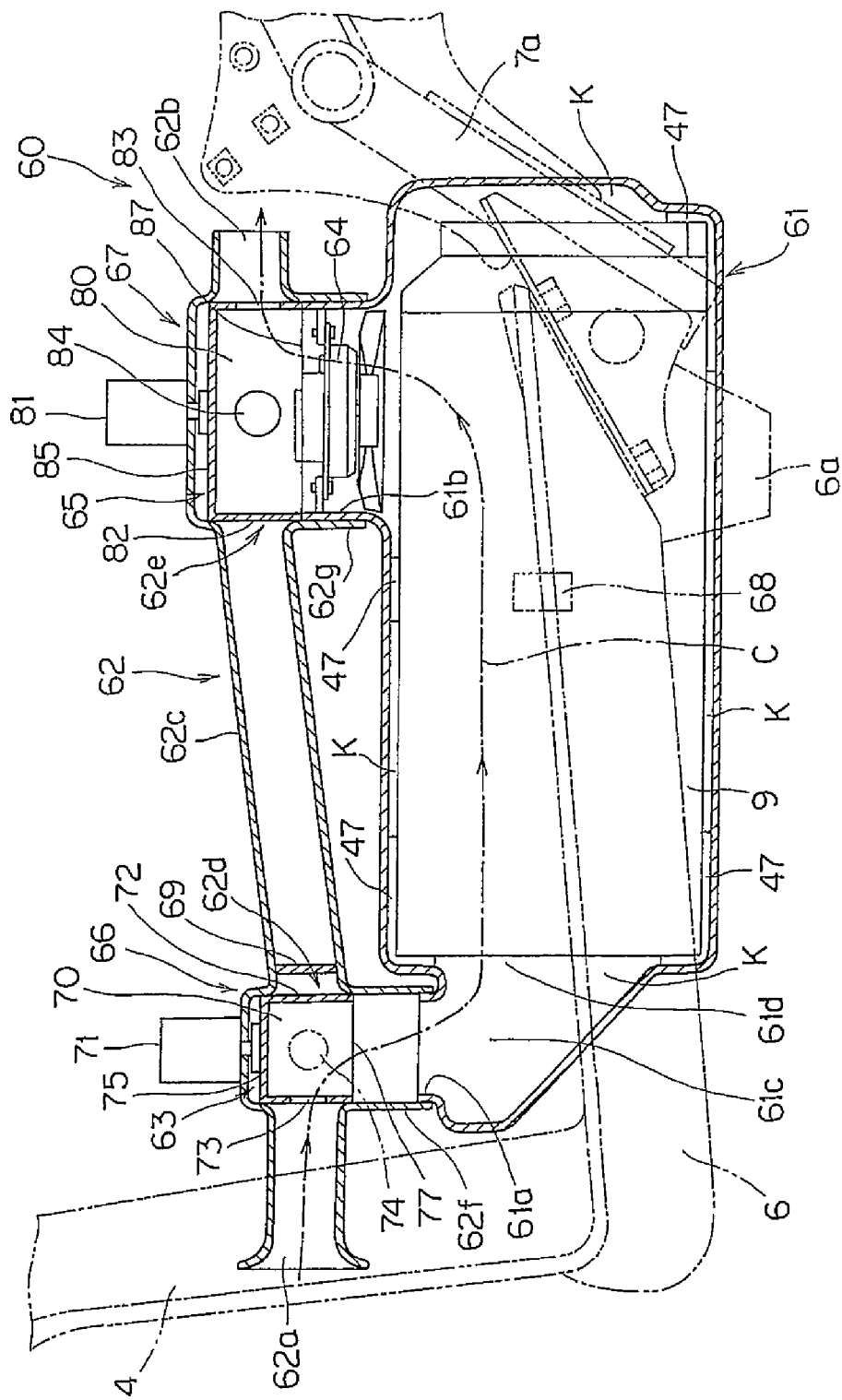
FIG. 8 is a side cross-sectional view of the housing box during cooling operation of a battery.

FIG. 8 is a side cross-sectional view of the housing box 60, which shows how the air flows when the battery cells 9 are cooled.

When the controller 22a judges that the temperature of the battery cell 9 measured by the temperature sensor 68 is higher than the fourth reference temperature, the controller 22a performs opening control to open the inlet-side switching valve 63 and the outlet-side switching valve 65 by driving the valve switching motors 76, 86, and drives the fan 64 with a small air flow rate. In addition, the heating coil 69 is turned off under the control of the controller 22a.

Once the inlet-side switching valve 63 and the outlet-side switching valve 65 are controlled to be opened, as shown in FIGS. 6 and 8, the passage through which the inlet ports 62a, the main housing body 61 and the outlet port 62b communicate with one another is formed. Thereby, as shown by a reference sign C denoting an air flow C in the drawings, the air such as a running wind taken in through the inlet ports 62a is capable of being introduced into the main housing body 61 housing the battery cells 9. The battery cells 9 are accordingly capable of being cooled with the air thus introduced. After cooling the battery cells 9, the air is discharged through the outlet port 62b.

Specifically, as shown in FIG. 6, the air taken in through the left and right inlet ports 62a flows into the main housing body 61, after the flow of the air is controlled by the inlet-side switching valve 63. Subsequently, the air passes the ventilation passages T and the gaps K (shown in FIG. 8) on the sides of the battery cells 9, and thereby absorbs the heat from the battery cells 9. Thereafter, the resultant air is discharged toward the vehicle rear through the outlet port 62b after the flow of the air is controlled by the outlet-side switching valve 65.

At this time, because the fan 64 is driven, it is possible to efficiently discharge the air from the inside of the main housing body 61, and accordingly to effectively cool the battery cells 9. Consequently, once the controller 22a detects the temperatures 9 of the respective battery cells 9 reach the appropriate value on the basis of the temperature sensor 68 after the battery cells 9 are cooled by the air flow C, the controller 22a stops the fan 64.

Furthermore, when a sufficient amount of wind is not available while the vehicle is running at slow speed or while the vehicle is stopped, the controller 22a drives the fan 64 with a large air flow rate, and thus causes the fan 64 to produce the air flow C so as to cool the battery cells 9.

Figure 9:
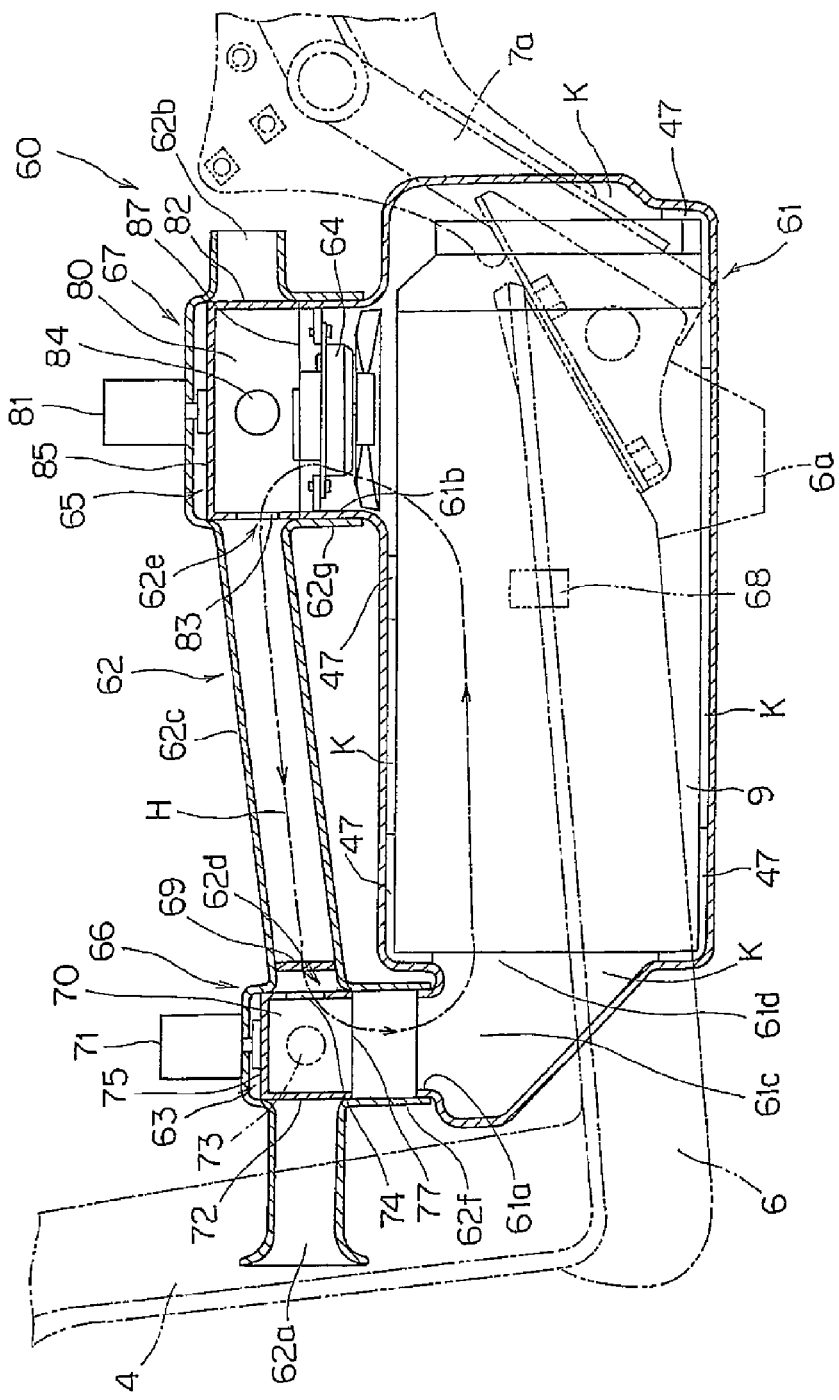
FIG. 9 is a side cross-sectional view of the housing box during heating operation of a battery.

FIG. 9 is a side cross-sectional view of the housing box 60, which shows how the air flows when the battery cells 9 are heated.

Once the controller 22a judges that the temperature of the battery cell 9 measured by the temperature sensor 68 is lower than the third reference temperature, the controller 22a drives the valve switching motors 76, 86, and thus performs closing control to close the inlet-side switching valve 63 and the outlet-side switching valve 65.

Concurrently, the controller 22a drives the fan 64 with a large air flow rate, and turns on the heating coil 69. Once the inlet-side switching valve 63 and the outlet-side switching valve 65 are controlled in order to be closed, as shown in FIGS. 7 and 9, the inlet ports 62a and the outlet port 62b are closed, and the bypass passage 62c concurrently communicates with the inlet-side bifurcation part 66 and the outlet-side bifurcation part 67. Thereby, a passage through which the air inside the main housing body 61 can circulate through the bypass passage 62c is formed. As shown by a reference sign H denoting an air flow H in the drawings, the drive of the fan 64 returns the air inside the main housing body 61 to the inlet-side switching valve 63 through the bypass passage 62c, and the air circulates inside the housing box 60.

Specifically, as shown in FIGS. 7 and 9, the air inside the main housing body 61 flows to the outlet-side bifurcation part 67 after being drawn out by the fan 64. Subsequently, the flow of the air is controlled by the outlet-side switching valve 65. The resultant air flows in the bypass passage 62c, and is thus heated by the heating coil 69 installed in the front portion of the bypass passage 62c. Thereafter, the air heated by the heating coil 69 returns to the main housing body 61 after its flow is controlled by the inlet-side switching valve 63. The air passes the ventilation passages T and the gaps K on the sides of the battery cells 9, and thus heats the battery cells 9.

As described above, the fan 64 circulates the air heated by the heating coil 69 in the housing box 60, and the battery cells 9 are thereby effectively heated. In addition, because the fan 64 is driven at the large air flow rate, a large amount of heat is capable of being supplied to the battery cells 9, and the battery cells 9 are thus capable of effectively being heated. Furthermore, each battery cell 9 produces heat while electric power is used from the battery cell 9, and the air inside the main housing body 61 is heated by the heat produced by each battery cell 9. The air heated by the heat produced by each battery cell 9 is circulated. Accordingly, the battery cells 9 are capable of being heated.

Therefore, the battery cells 9 are capable of being effectively heated by use of the exhaust heat recovered from each battery cell 9. Moreover, the heating coil 69 is placed in the bypass passage 62c, and the heating coil 69 is arranged so as not to obstruct the flow of the air flow C when the air flow C cools the battery cells 9. For this reason, the heating coil 69 does not hinder the battery cells 9 from being cooled.

After that, once the controller 22a detects the temperatures of the respective battery cells 9 reach the appropriate value on the basis of the temperature sensor 68 after the battery cells 9 are heated by the air flow H, the controller 22a stops the fan 64, and concurrently turns off the heating coil 69 so as to perform control to open the inlet-side switching valve 63 and the outlet-side switching valve 65.

Subsequently, once the controller 22a judges the temperature of the battery cell 9 measured by the temperature sensor 68 is not lower than the third reference temperature, and is lower than the second reference temperature, the controller 22a performs control to close the inlet-side switching valve 63 and the outlet-side switching valve 65.

Concurrently, the controller 22a drives the fan 64 with the small air flow rate, and turns on the heating coil 69. Thereby, the fan 64 circulates the air heated by the heating coil 69. Thus, the battery cells 9 are capable of being effectively heated. In addition, because the fan 69 is driven at the small air flow rate, an appropriate amount of heat is capable of being supplied to the battery cells 9 while the power consumption of each battery cell 9 is reduced to a minimum. Thereby, the battery cells 9 are capable of being effectively heated.

After that, once the controller 22a detects the temperatures of the respective battery cells 9 reach the appropriate value on the basis of the temperature sensor 68 after the battery cells 9 are heated by the air flow H, the controller 22a stops the fan 64, and concurrently turns off the heating coil 69 so as to perform control to open the inlet-side switching valve 63 and the outlet-side switching valve 65.

In addition, once the controller 22a judges that the temperature of the battery cell 9 measured by the temperature sensor 68 is not lower than the second reference temperature, and lower than the first reference temperature, the sensor 22a performs control to close the inlet-side switching valve 63 and the outlet-side switching valve 65. Concurrently, the controller 22a stops the fan 64, and turns off the heating coil 69. While the inlet-side switching valve 63 and the outlet-side switching valve 65 are in this condition, the inlet ports 62a are closed by the inlet-side switching valve 63, whereas the outlet port 62b is closed by the outlet-side switching valve 65.

Thereby, the air heated by the heat produced by the battery cells 9 stays inside the housing box 60, and the battery cells 9 are thus capable of being heated by use of the exhaust heat recovered from each battery cell 9. This makes it possible to heat the battery cells 9 by effective use of the exhaust heat recovered from each battery cell 9 without use of the heating coil 69.

Subsequently, once the controller 22a detects that the temperatures of the respective battery cells 9 reach the appropriate value on the basis of the temperature sensor 68 after the battery cells 9 are heated by the air flow H, the controller 22a stops the fan 64, and concurrently turns off the heating coil 69 so as to perform control to open the inlet-side switching valve 63 and the outlet-side switching valve.

Moreover, once the controller 22a judges that the temperature of the battery cell 9 measured by the temperature sensor 68 is not lower than the first reference temperature, and lower than the fourth reference temperature, the controller 22a performs control to open the inlet-side switching valve 63 and the outlet-side switching valve 65. Concurrently, the controller 22a stops the fan 64, and turns off the heating coil 69. In this case, as shown in FIG. 8, the air flow C occurs in the housing box 60 due to a running wind. Thereby, the battery cells 9 are cooled by the running wind.

According to the present invention, the temperature range which is not lower than the first reference temperature, and lower than the fourth reference temperature is defined as a temperature zone appropriate for the use of the battery cells 9. While the temperatures of the respective battery cells 9 are within this temperature zone, the inlet-side switching valve 63 and the outlet-side switching valve 65 are opened, and the battery cells are thus cooled by use of the running wind.

In addition, as shown in FIGS. 1 and 2, the outlet port 62b of the housing box 60 and the front-side opening part 13a of the swing arm 13 are arranged in such a way as to be continuous in the front-rear direction, and are placed close to each other in the vehicle width and height directions. Thereby, the air flowing out of the outlet port 62b is capable of being introduced to the inside of the swing arm 13, and the PDU 18 and the motive power generating motor 16 are thus capable of being cooled. Furthermore, the inside of the swing arm 13 is capable of being effectively cooled, because the air is blown into the inside of the swing arm 13 by driving the fan 64.

As described above, the embodiment to which the present invention is applied allows the inlet-side switching valve 63 to control the air taken in through the inlet ports 62a in order that the air should flows into the inside of the main housing body 61, and allows the outlet-side switching valve 65 to control the air in order that the air should flow from the main housing body 61 to the outlet port 62b. Thereby, the embodiment enables the battery cells 9 to be air-cooled by the air taken in through the inlet ports 62a.

In addition, the embodiment allows the inlet-side switching valve 63 and the outlet-side switching valve 65 to control the air inside the housing box 60 in order that the air should circulate through the bypass passage 62c by closing the passage between the inlet ports 62a and the main housing body 61, as well as the passage between the main housing body 61 and the outlet port 62b.

Therefore, the illustrative embodiment enables the battery cells 9 to be heated by circulating the air heated by the heat produced by each battery cell 9 and the like. Consequently, the embodiment enables the battery cells 9 to be cooled or heated by causing the inlet-side switching valve 63 and the outlet-side switching valve 65 to control the flow of the air flowing to the inside of the housing box 60, and accordingly makes it possible to adjust the temperatures of the respective battery cells 9 to the appropriate temperature. Thereby, the embodiment is capable of always keeping the battery cells 9 in a suitable condition, and is thus capable of stably supplying electric power to the motive power generating motor 16 of the saddle-riding type electric vehicle 1.

Moreover, the lid body member 62 includes the inlet ports 62a, the outlet port 62b, the bypass passage 62c, the inlet-side switching valve 63 and the outlet-side switching valve 65. Because all the component parts concerning the controlling of the flow of the air are thus provided collectively to the lid body member 62, the embodiment enhances the maintainability and assemblability. Additionally, the embodiment is advantageous in that the main housing body 61 can be constructed with the simplified structure.

In addition, the embodiment controls the opening and closing of each of the inlet-side switching valve 63 and the outlet-side switching valve 65 depending on the temperatures of the respective battery cells 9 inside the housing box 60, and thus adjusts the flow of the air inside the housing box 60. Accordingly, the embodiment is capable of appropriately adjusting the temperatures of the respective battery cell 9 depending on the temperatures of the respective battery cells 9.

Furthermore, the embodiment controls the air flow rate of the fan 64 depending on the temperatures of the respective battery cells 9 inside the housing box 60, and adjusts the flow of the air inside the housing box 60. Thereby, the battery housing structure is capable of appropriately adjusting the temperatures of the respective battery cells 9 depending on the temperatures of the respective battery cells 9.

Moreover, in the case where the temperatures of the respective battery cells 9 are not lower than the first reference temperature, the embodiment opens the inlet-side switching valve 63 and the outlet-side switching valve 65. Thereby, the embodiment is capable of cooling the battery cells 9, by use of the air which passes the main housing body 61 after taken in through the inlet ports 62a, and which is discharged through the outlet port 62b.

Besides, in the case where the temperatures of the respective battery cells 9 are lower than the first reference temperature, the embodiment closes the inlet-side switching valve 63 and the outlet-side switching valve 65, as well as accordingly closes the inlet ports 62a and the outlet port 62b. For this reason, the battery housing structure is capable of making the air stay inside the housing box 60. Thereby, the air heated by the heat produced by the battery cells 9 and the like stays inside the housing box 60. Consequently, the embodiment is capable of heating the battery cells 9 by use of this heated air.

It should be noted that the embodiment shows only an aspect of the application of the present invention, and that the present invention is not limited to the foregoing embodiment.

The foregoing embodiment has been described as one in which the housing box 60 includes the main housing body 61 and the lid body member 62. However, the present invention is not limited to this embodiment only. For instance, the housing box may be a box body formed by integrating the main housing body 61 and the lid body member 62 into a single unit.

In addition, the foregoing embodiment has been described as one in which the temperature sensor 68 for measuring the temperature of one of the battery cells 9 is provided to a side surface of the battery cell 9. However, the present invention is not limited to this embodiment only. For instance, a temperature sensor may be instead provided to at least one of the inlet ports 62a, the outlet port 62b and the main housing body 61 so as to control the opening and closing of each of the inlet-side switching valve 63 and the outlet-side switching valve 65 on the basis of the temperature of the air flowing inside housing box 60.

Furthermore, the foregoing embodiment has been described as one which drives the fan 64 with the large air flow rate in the case where a sufficient amount of air is not available while the vehicle is running at slow speed, or while the vehicle is stopped. However, the present invention is not limited to this embodiment. Instead, the battery cells 9 may be cooled by switching the air flow rate of the fan 64 on the basis of an output from the temperature sensor 68.

Moreover, the foregoing embodiment has been described as operating to close the inlet-side switching valve 63 and the outlet-side switching valve 65 in the case where the temperatures of the respective battery cells 9 are lower than the first reference temperature.

However, the present invention is not limited to this embodiment. For example, the inlet-side switching valve 63 and the outlet-side switching valve 65 may be controlled to be closed. In this case, because the inlet ports 62a or the outlet port 62b is closed, air inside the housing box 60 stays therein, and accordingly this air is warmed to heat the battery cells 9.

Besides, the foregoing embodiment has been described as one in which the controller 22a switches the inlet-side switching valve 63 and the outlet-side switching valve 65 depending on the output from the temperature sensor 68. However, the present invention is not limited to this embodiment. For example, the inlet-side switching valve 63 and the outlet-side switching valve 65 may be each configured to be capable of being switched by use of a component which changes its own shape like a bimetal so as to adjust the flow of the air inside the housing box 60. Additionally, the foregoing embodiment has been described as one in which the heating coil 69 is turned on or off under the control of the controller 22a. Instead, the heating coil 69 may be turned on or off by a bimetal or the like.

In addition, the foregoing embodiment has been described as one which performs control to open the inlet-side switching valve 63 and the outlet-side switching valve 65 in the case where the temperatures of the respective battery cells 9 are not lower than the first reference temperatures. However, the present invention is not limited to this embodiment. For example, the battery cells 9 may be cooled by opening the outlet-side switching valve 65 only, and by causing the fan 64 to discharge the air from the inside of the housing box 60 through the outlet port 62b.

Furthermore, the foregoing embodiment has been described as one which is configured so that both the opening and closing of each of the inlet-side switching valve 63 and the outlet-side switching valve 65 are controlled by using the first reference temperature as the reference for the control. However, the present invention is not limited to this embodiment.

Instead, reference temperature for the opening control of each of the inlet-side switching valve 63 and the outlet-side switching valve 65 as well as the reference temperature for the closing control of each of the inlet-side switching valve 63 and the outlet-side switching valve 65 may be different from each other. It goes without saying that the rest of the detailed configuration may be modified arbitrarily.

In other words, although the present invention has been described herein with respect to a specific illustrative embodiment, the foregoing description is intended to illustrate, rather than to limit the invention. Those skilled in the art will realize that many functional modifications of the described embodiment could be made. All such modifications, which are within the scope of the claims, are intended to be within the scope and spirit of the present invention.

What is claimed is:

1. A battery housing structure for a saddle-riding type electric vehicle having a battery placed between a front wheel and a rear wheel in a vehicle front-rear direction, said battery housing structure comprising:
   a housing box for receiving said battery comprising multiple battery cells therein;
   an intake duct member having inlet ports formed therein for supplying air to the housing box; said inlet ports configured and arranged to receive air from an area forward of the housing box during operation of the vehicle;
   an outlet port configured and arranged for discharging air rearwardly from the housing box;
   a fan for discharging air from the housing box;
   a bypass passage operatively connecting a portion of the housing box downstream of said fan with a portion of the housing box proximate the inlet ports;
   a first air flow control valve for selectively controlling flow of air from the inlet ports to the housing box, or from an exit of the bypass passage to the housing box; and
   a second air flow control valve for selectively controlling flow of air from the housing box to the outlet port, or from the housing box to an entrance of the bypass passage.

2. The battery housing structure according to claim 1, wherein the housing box comprises a main housing body and a lid body member, and wherein the lid body member comprises the intake duct member, the outlet port, the bypass passage, the first air flow control valve and the second air flow control valve.

3. A temperature control system, including the battery housing structure according to claim 1 and a controller for controlling operations of said first air flow control valve and said second air flow control valve based on an output received from a temperature sensor arranged in at least one of the inlet ports, the outlet port and the housing box.

4. A temperature control system, including the battery housing structure according to claim 2 and a controller for controlling operations of said first air flow control valve and said second air flow control valve based on an output received from a temperature sensor arranged in at least one of the inlet ports, the outlet port and the housing box.

5. A temperature control system, including the battery housing structure according to claim 1 and a controller for controlling an air flow rate of the fan in order to regulate a temperature of said battery cells, said controller operatively connected to a temperature sensor arranged in at least one of the inlet ports, the outlet port and the housing box.

6. A temperature control system, including the battery housing structure according to claim 2 and a controller for controlling an air flow rate of the fan in order to regulate a temperature of said battery cells, said controller operatively connected to a temperature sensor arranged in at least one of the inlet ports, the outlet port and the housing box.

7. The temperature control system of claim 3, wherein said controller is operable to control an air flow rate of the fan.

8. The temperature control system of claim 3, wherein when a temperature measured by the temperature sensor is higher than a reference temperature, said controller operates the first air flow control valve and the second air flow control valve such that air flows from said inlets to outlet port via said housing box.

9. The temperature control system of claim 5, wherein when a temperature measured by the temperature sensor is higher than a reference temperature, said controller operates the first air flow control valve and the second air flow control valve such that air flows from said inlets to outlet port via said housing box.

10. The temperature control system of claim 3, wherein when a temperature measured by the temperature sensor is lower than a reference temperature, said controller operates at least one of the first air flow control valve and the second air flow control valve such that said inlet ports and said outlet port are closed.

11. The temperature control system of claim 4, wherein when a temperature measured by the temperature sensor is lower than a reference temperature, said controller operates at least one of the first air flow control valve and the second air flow control valve such that said inlet ports and said outlet port are closed.

12. The temperature control system of claim 8, wherein when a temperature measured by the temperature sensor is lower than a reference temperature, said controller operates at least one of the first air flow control valve and the second air flow control valve such that said inlet ports and said outlet port are closed.

13. An electric vehicle comprising:
a battery placed between a front wheel and a rear wheel in the vehicle; said battery comprising a plurality of cells;
a housing box for receiving said battery therein;
a lid body having inlet ports and an outlet port formed therein, said inlet ports configured and arranged to receive air from an area forward of the housing box during operation of the vehicle;
said outlet port being configured to discharge air rearwardly from the housing box;
a fan for discharging air from the housing box through the outlet port;
said lid body having a bypass passage formed therein, said bypass passage operatively connecting a downstream side of said fan with the inlet ports;
a first air flow control valve for selectively controlling flow of air from the inlet ports to the housing box, or from an exit of the bypass passage to the housing box; and
a second air flow control valve for selectively controlling flow of air from the housing box to the outlet port, or from the housing box to an entrance of the bypass passage.

14. An electric vehicle according to claim 13, further comprising a controller for controlling operations of said first air flow control valve and said second air flow control valve based on an output received from a temperature sensor arranged in at least one of the inlet ports, the outlet port and the housing box for adjusting temperature of said battery cells.

15. An electric vehicle according to claim 13, further comprising a controller for controlling an air flow rate of the fan based on an output received from a temperature sensor arranged in at least one of the inlet ports, the outlet port and the housing box for adjusting temperature of said battery cells.

16. An electric vehicle according to claim 14, wherein when a temperature measured by the temperature sensor is higher than a reference temperature, said controller operates the first air flow control valve and the second air flow control valve such that air flows from said inlets to outlet port via said housing box; and
wherein when a temperature measured by the temperature sensor is lower than a reference temperature, said controller operates at least one of the first air flow control valve and the second air flow control valve such that said inlet ports and said outlet port are closed.

17. An electric vehicle according to claim 14, further comprising a heating element which is operable to heat air re-circulating through said housing box when a temperature measured by the temperature sensor is lower than a reference temperature.

18. A method of regulating a temperature of a battery in an electric vehicle, said battery being disposed in a battery compartment of a battery housing structure arranged between front and rear wheels of the vehicle; the battery housing structure comprising a fan; and a lid body having inlet ports, an outlet port and a bypass passage connecting downstream side of said fan with said inlet ports formed therein; a first air flow control valve for selectively controlling flow of air from the inlet ports to the housing box, or from an exit of the bypass passage to the housing box; a second air flow control valve for selectively controlling flow of air from the housing box to the outlet port, or from the housing box to an entrance of the bypass passage; a controller for controlling operations of said first and second air flow control valves; and a temperature sensor for sensing temperature of said battery;
said method comprising the steps of
sensing a present temperature of said battery using a temperature sensor;
controlling the first air flow control valve and the second air flow control valve such that air flows from said inlets to outlet port via said battery compartment when the temperature measured by the temperature sensor is higher than a reference value; and
controlling at least one of the first air flow control valve and the second air flow control valve such that said inlet ports and said outlet port are closed and air re-circulates within said battery housing structure when the temperature measured by the temperature sensor is lower than said reference value.

19. A method of regulating temperature of a battery in an electric vehicle according to claim 18, further comprising the step of regulating airflow rate of said fan based on output received from said temperature sensor.

20. A method of regulating temperature of a battery in an electric vehicle according to claim 18, further comprising the step of heating air within said battery housing structure when a temperature measured by the temperature sensor is lower than said reference value.

* * * * *